(12) United States Patent
Homma et al.

(10) Patent No.: US 12,725,975 B2
(45) Date of Patent: Sep. 1, 2026

(54) STRUCTURE FOR DETECTION OF THE NUMBER OF ITEMS IN AN ELECTRICAL CONNECTOR

(71) Applicant: Yazaki Corporation, Tokyo (JP)

(72) Inventors: Hideki Homma, Tokyo (JP); Masaki Imamura, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 351 days.

(21) Appl. No.: 18/605,934

(22) Filed: Mar. 15, 2024

(65) Prior Publication Data

US 2024/0347973 A1 Oct. 17, 2024

(30) Foreign Application Priority Data

Apr. 11, 2023 (JP) ................................ 2023-064247

(51) Int. Cl.

| | |
|---|---|
| ***H01R 13/641*** | (2006.01) |
| ***B60R 16/02*** | (2006.01) |
| ***H01R 13/639*** | (2006.01) |
| ***H01R 43/20*** | (2006.01) |
| *G01B 5/20* | (2006.01) |
| *G01M 13/00* | (2019.01) |
| *H01R 13/64* | (2006.01) |
| *H01R 13/642* | (2006.01) |
| *H01R 43/00* | (2006.01) |

(52) U.S. Cl.

CPC ....... *H01R 13/641* (2013.01); *B60R 16/0207* (2013.01); *H01R 13/639* (2013.01); *H01R 43/20* (2013.01); *B60R 16/02* (2013.01); *G01B 5/20* (2013.01); *G01M 13/00* (2013.01); *H01R 13/64* (2013.01); *H01R 13/642* (2013.01); *H01R 43/00* (2013.01); *H01R 43/205* (2013.01)

(58) Field of Classification Search

CPC .... H01R 13/641; H01R 13/639; H01R 43/20; H01R 13/64; H01R 13/642; H01R 43/00; H01R 43/205; B60R 16/0207; B60R 16/02; G01B 5/20; G01M 13/00

See application file for complete search history.

(56) References Cited

FOREIGN PATENT DOCUMENTS

| | | | |
|---|---|---|---|
| JP | 8-17531 A | | 1/1996 |
| JP | H0817531 A | * | 1/1996 |

* cited by examiner

*Primary Examiner* — Justin M Kratt

(74) *Attorney, Agent, or Firm* — Sughrue Mion, PLLC

(57) ABSTRACT

A different-item-number detection structure for detecting whether a combination of a connector and a push-in jig is regular, wherein the connector includes a plurality of busbars and a housing including a plurality of busbar accommodation rooms, the housing includes a housing main body formed and an insulation wall to partition an inside of the housing main body to insulate the busbars from each other, the push-in jig includes a jig main body, a plurality of push-in portions provided to protrude from the jig main body for pushing in the busbars, and a detection portion provided in the jig main body and configured to detect whether or not the housing is regular, when the push-in jig is pushed toward the housing, in a case in which the detection portion is not in/in contact with the insulation wall, it is detected that the housing and the push-in jig form a regular/irregular combination.

3 Claims, 7 Drawing Sheets

1
2
3
21
22
20
2
31A
31C
31B
31
5
7
UPPER SIDE Z1
LOWER SIDE Z2
REAR SIDE X2
FRONT SIDE X1
LEFT-RIGHT DIRECTION Y 42
42S
2
42
42S
2
20
2
1
3
32
33
30
4
43
31C
31C
410
410
41
5
REAR SIDE X2
LEFT-RIGHT DIRECTION Y
UP-DOWN DIRECTION Z
FRONT SIDE X1

42
42S
21
21
2
2
30
30
32
32
22
22
44
44
43
43
44
44
20
20
33
33
REAR SIDE X2
LEFT-RIGHT DIRECTION Y
UP-DOWN DIRECTION Z
FRONT SIDE X1

STRUCTURE FOR DETECTION OF THE NUMBER OF ITEMS IN AN ELECTRICAL CONNECTOR

TECHNICAL FIELD

The present invention relates to a different-item-number detection structure.

BACKGROUND ART

In a vehicle, various of electronic devices are equipped and wire harnesses are routed therein to transmit power and control signals to the electronic devices. The wire harness comprises a plurality of electric wires and a connector, and the wire harness is connected to another electronic device and another wire harness by fitting this connector to the connector of the electronic device and the connector of other wire harness.

Regarding a joint connector used in such a wire harness, the joint connector is configured to include a busbar in a substantially flat-plate shape forming a structure in which a plurality of tongue-shaped tab terminals (in a case of this example, two tongue-shaped tab terminals) are made to extend from a base plate portion in a flat strip shape and a connector housing configured to accommodate and hold this busbar (for example, referring to Patent Document 1).

In the connector housing, flat and narrow busbar retaining grooves to which the busbar is fitted and retained therein are provided in two rows on the rear end surface while an opening portion is provided at the front side so as to make each tab terminal of the busbar that is fitted to the busbar retaining groove to protrude into the opening portion. Also, a jig guide groove for inserting the busbar into the busbar retaining groove is configured on the rear end surface in the connector housing so as to be orthogonal to the busbar retaining groove.

In a case of assembling such joint connector, each tab terminal of the busbar is brought to approach and be inserted into the busbar retaining groove, a busbar insertion jig is brought to approach the jig guide groove to press the base plate portion of the busbar into the busbar retaining groove. Accordingly, the busbar is fitted and retained in the busbar retaining groove, and the busbar is accommodated and held in the connector housing.

CITATION LIST

Patent Documents

[Patent Document 1] JP H8-17531A

SUMMARY OF THE INVENTION

Technical Problem

Regarding such a conventional joint connector, for example, in a case in which the busbars with different joint terminals and arrangements are accommodated in the connector housing, different item numbers are assigned and managed. In this case, it is desirable to provide a dedicated shape to the connector housing for identifying whether the number of items the housing has is a desired item number, however, it is undesirable that the dedicated shape would lead to an enlargement of the connector housing.

An object of the present invention is to provide a different-item-number detection structure to make it possible to identify the housing without the enlargement of the housing.

Solution to Problem

In order to solve the above-mentioned technical problem, according to the present invention, a different-item-number detection structure for detecting whether a combination of a connector and a push-in jig is regular is provided, wherein the connector includes a plurality of busbars and a housing including a plurality of busbar accommodation rooms configured to accommodate the plurality of busbars respectively, the housing includes a housing main body formed in a cylindrical shape and an insulation wall configured to partition an inside of the housing main body to insulate the busbars from each other, the busbar accommodation room being provided in a space that is partitioned by the insulation wall, the push-in jig includes a jig main body, a plurality of push-in portions provided to protrude from the jig main body for pushing in the busbars, and a detection portion provided in the jig main body and configured to detect whether or not the housing is regular. When the push-in jig is pushed toward the housing, in a case in which the detection portion is not in contact with the insulation wall, it is detected that the housing and the push-in jig form a regular combination, and when the push-in jig is pushed toward the housing, in a case in which the detection portion is in contact with the insulation wall, it is detected that the housing and the push-in jig form an irregular combination.

Effect of the Invention

According to the present invention, it is possible to identify the housing without providing a dedicated shape.

DESCRIPTION OF EMBODIMENTS

Figure 1:
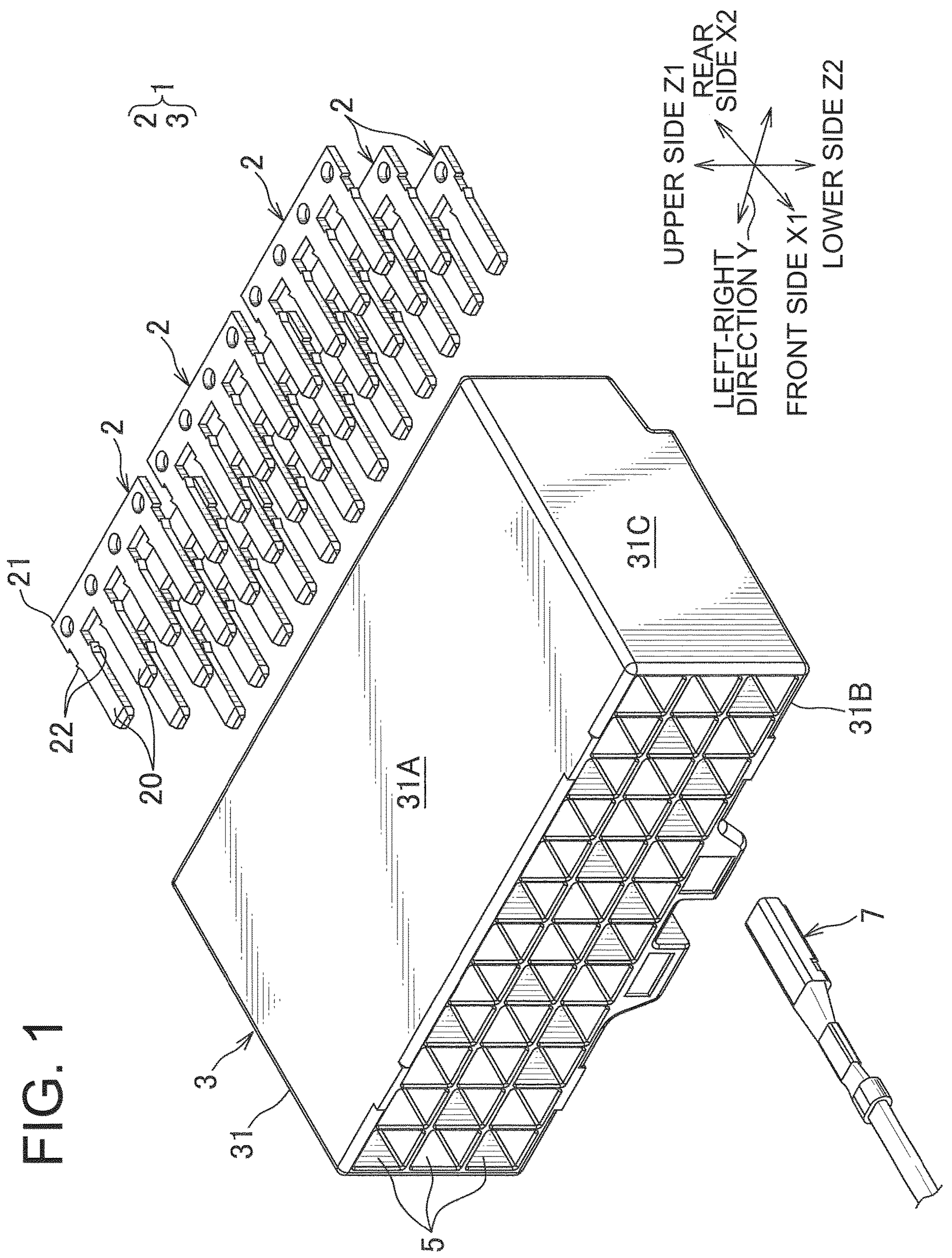
FIG. 1 is an exploded perspective view showing a connector configuring a different-item-number detection structure according to an embodiment of the present invention.
Figure 2:
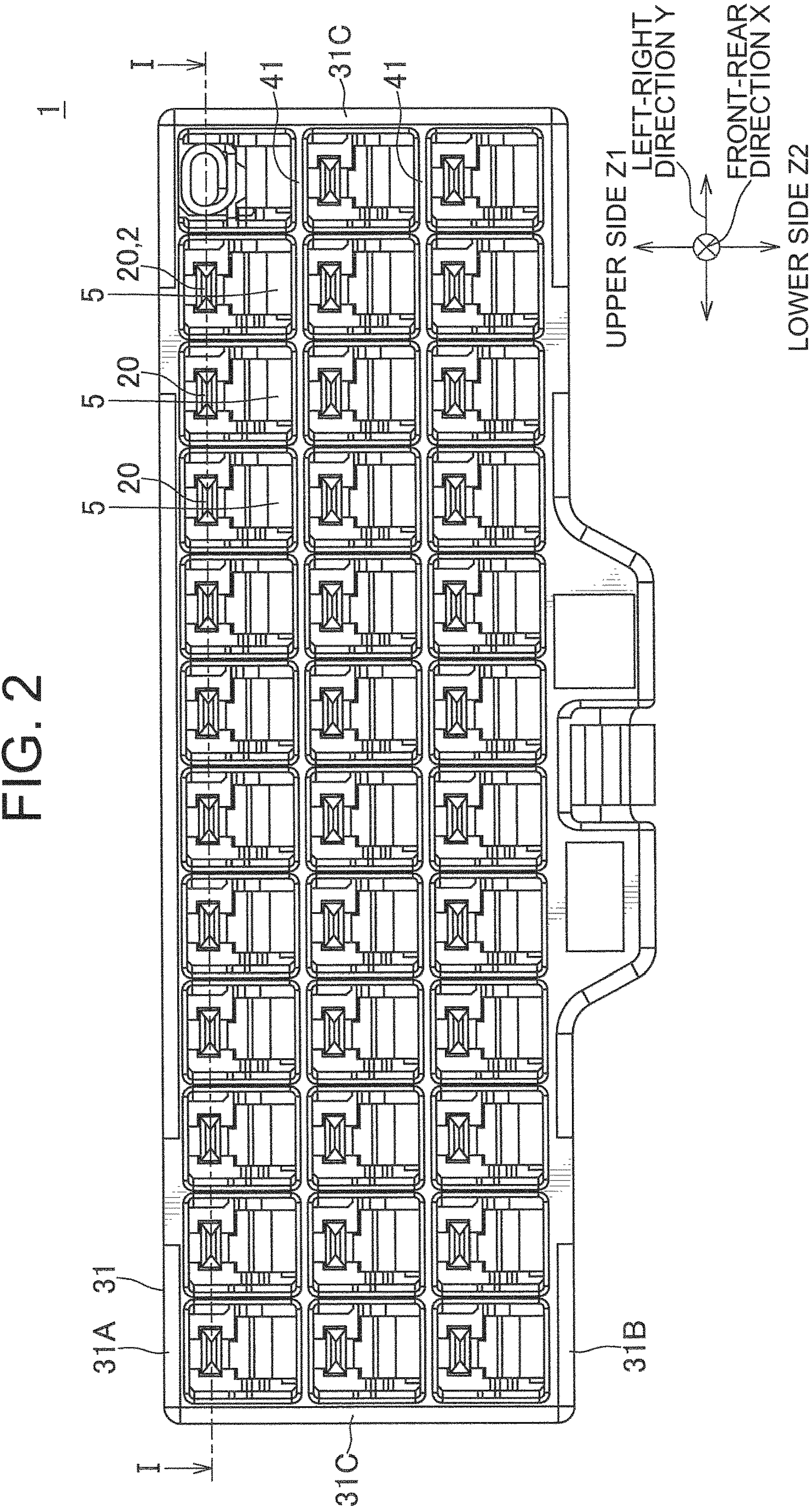
FIG. 2 is a planar view showing the above-described connector viewed from a front side.

An embodiment of the present invention will be described below with reference to FIG. 1 to FIG. 7B. FIG. 1 is an exploded perspective view showing a connector 1 configuring a different-item-number detection structure 10 according to an embodiment of the present invention.

As shown in FIG. 6A to FIG. 7B, the different-item-number detection structure 10 according to the present embodiment is configured to detect whether a combination of the connector 1 and a push-in jig 6 is a regular combination, and includes the connector 1 together with the push-in jig 6 for assembling the connector 1. The different-item-number detection structure 10 is configured to detect whether a housing 3 configuring the connector 1 is the housing 3 assigned with a desired item number by using the push-in jig 6.

Figures 3A, 3B:
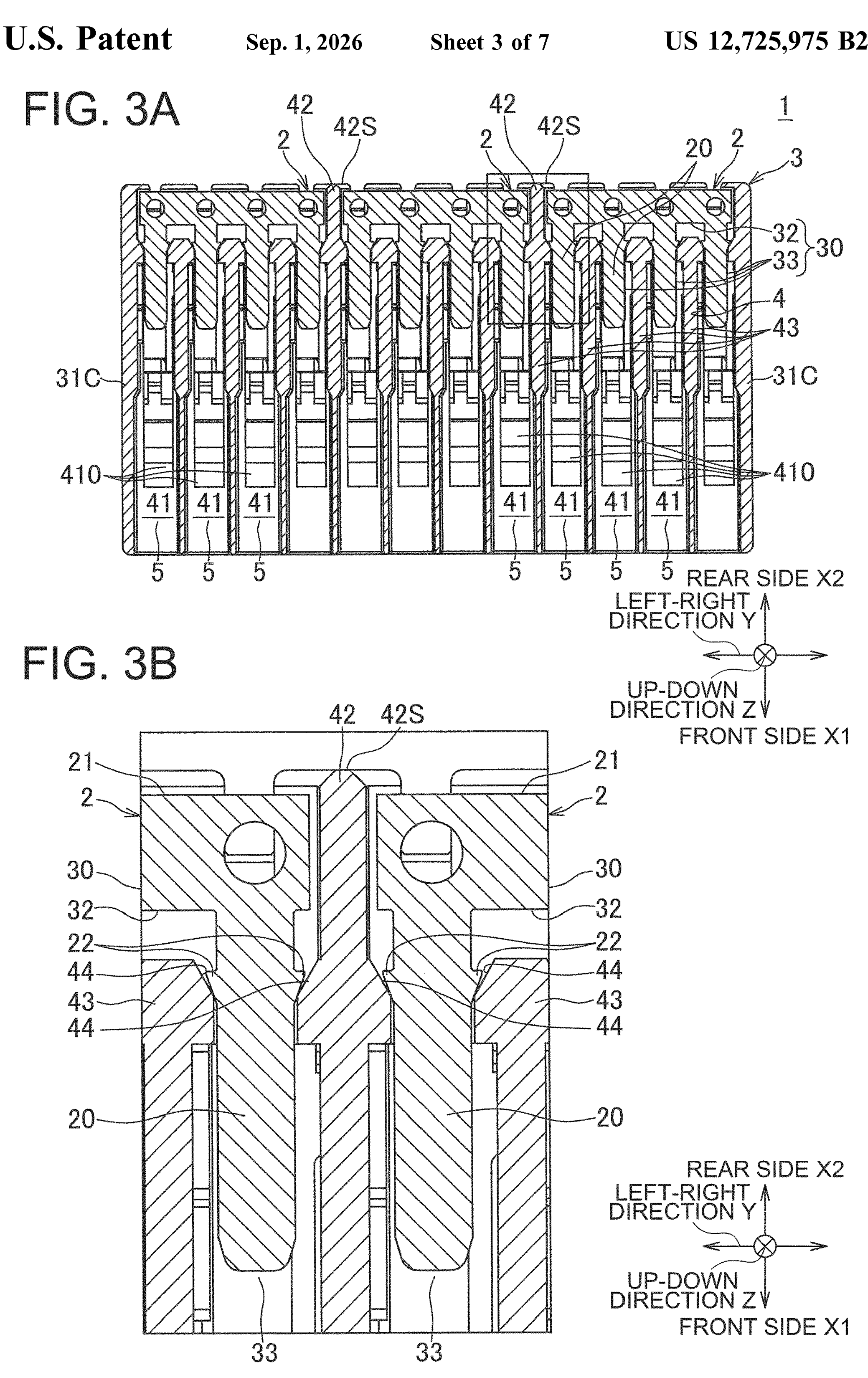
FIG. 3A is a cross-sectional view taken along a line I-I in FIG. 2.
FIG. 3B is an enlarged view showing a main portion in FIG. 3A.

The connector 1, as shown in FIG. 1 to FIG. 3B, comprises a plurality of busbars 2 having a plurality of tab terminals 20, and a housing 3 having busbar accommodation rooms 30 (shown in 3A and FIG. 3B) for accommodating the plurality of busbars 2 respectively. As shown in FIG. 1, FIG. 3A, and FIG. 3B, the connector 1 is configured such that, in a state where the busbar 2 is accommodated in the busbar accommodation room 30, each tab terminal 20 is inserted and connected to a female terminal fitting 7 (shown in FIG. 1, and hereinafter recorded as a female terminal 7).

In such connector 1, there are a plurality of housings 3A, 3B(3) in which the joint terminals and the arrangement of the busbars 2 are different, and the shape of the busbar accommodation rooms 30 are different from each other existing therein, and such housings 3A, 3B are assigned with different item numbers and managed. The push-in jig 6 according to the present embodiment is configured to correspond to the housing 3A that the housing 3A and the push-in jig 6 are used as a set. The housings 3A, 3B are different from each other in the point in which the insulation wall 42 described below is different. The push-in jig 6 detects whether the housing 3 is assigned with the desired item number in response to the position of the insulation wall 42 in the housing 3. Hereinafter, the housings 3A, 3B will be recited only in a case in which it is necessary to distinct them, and in other cases, it will be recited as the housing 3.

As shown in FIG. 1, FIG. 3A, and FIG. 3B, the busbar 2 is configured to integrally include a rectangular plate-shaped base portion 21, a plurality of tab terminals 20 extending in a front side X1 from a predetermined position in the left-right direction Y in the base portion 21 (longitudinal direction of the base portion 21).

As shown in FIG. 1, FIG. 3A, and FIG. 3B, each tab terminal 20 is provided with a pair of extending pieces 22, 22 on both sides of the width direction Y. The pair of extending pieces 22, 22 are formed that an extending amount in the width direction Y gradually decreases as toward the front side X1. As shown in FIG. 3A and FIG. 3B, each tab terminal 20, when the busbar 2 is accommodated in the busbar accommodation room 30, is configured to come into contact with a displacement restriction portion 44 of an accommodation space configuration portion 4 described below so as to restrict a displacement of each tab terminal 20 in the width direction Y. According to the present embodiment, the number of the tab terminals 20 included by each busbar 2 is different from each other. The number of the tab terminals 20 included by each busbar 2 is equal to or more than three and equal to or less than six.

In the present embodiment, the direction in which each tab terminal 20 extends is recorded as a front-rear direction X, two directions being orthogonal to the front-rear direction X are recorded as a direction Y and a direction Z, respectively. In the front-rear direction X, there is a case in which the front-end side of each tab terminal 20 is recorded as the "front side X1", and the rear-end side being opposite to this is recorded as the "rear side X2". The direction Y is the width direction Y (there is a case in which the direction is recorded as the left-right direction Y) of the tab terminal 20, and the direction Z is the plate thickness direction Z (there is a case in which the direction is recorded as the up-down direction) of each tab terminal 20. There is a case in which one side in the plate thickness direction Z is recorded as the "upper side Z1", and the other side is recorded as the "lower side Z2".

The housing 3 is made of, for example, the insulating resin. As shown in FIG. 3A and FIG. 3B, the housing 3 includes a rectangular cylinder-shaped housing main body 31 with the front-rear direction X as an extending direction (axial direction of the cylinder), the accommodation space configuration portion 4 configured to partition the internal space of this housing main body 31, a plurality of busbar accommodation rooms 30 configured by the accommodation space configuration portion 4, and a plurality of female terminal accommodation rooms 5.

The housing main body 31, as shown in 4, is configured to include an upper wall 31A, a lower wall 31B facing the lower side Z2 of the upper wall 31A, and a pair of side walls 31C, 31C facing each other in the left-right direction Y and being continuous with the upper wall 31A and lower wall 31B.

Figure 4:
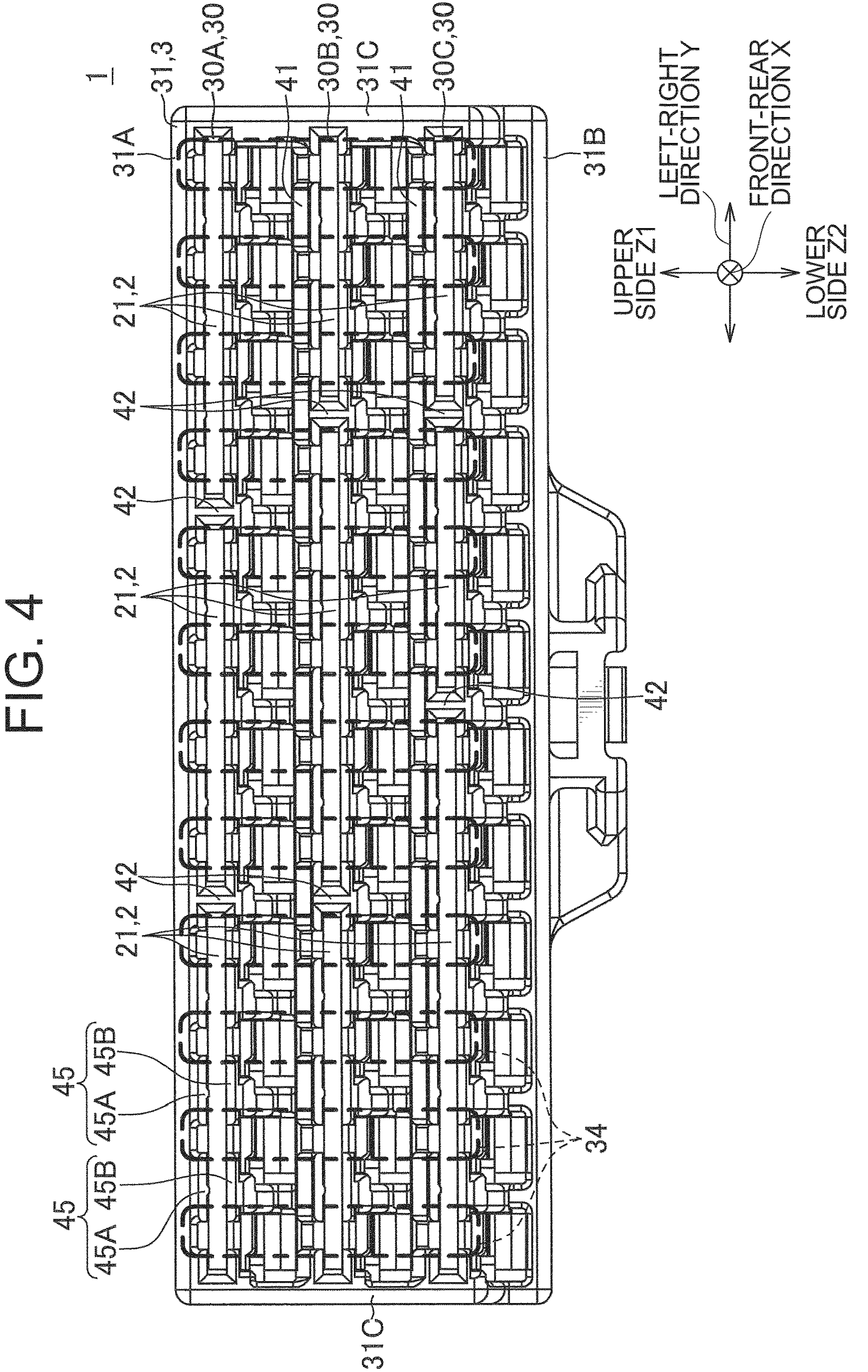
FIG. 4 is a planar view showing the connector when viewed from a rear side.

As shown in FIG. 3A, FIG. 3B and FIG. 4, the accommodation space configuration portion 4 includes an up-down partition wall 41 configured to partition the housing main body 31 in the up-down direction Z, an insulation wall 42 configured to insulate the busbars 2 from each other in the space being partitioned by this up-down partition wall 41, a left-right partition wall 43 (see FIG. 3A and FIG. 3B) configured to partition the plurality of tab terminal accommodation rooms 33 described below that are provided in each busbar accommodation room 30 from each other in the space being partitioned by this insulation wall 42, a displacement restriction portion 44 (see FIG. 3A and FIG. 3B) configured to restrict the displacement of the busbar 2 provided in each busbar accommodation room 30, and a busbar clamping portion 45 (see FIG. 4) configured to clamp and support the busbar 2 provided in each busbar accommodation room 30.

According to the present embodiment, as shown in FIG. 4, two of the up-down partition wall 41 are provided, and the housing main body 31 is partitioned into three spaces in the up-down direction Z by the up-down partition wall 41. Each up-down partition wall 41 is provided to extend on a plane including the front-rear direction X and the left-right direction Y.

Also, as shown in FIG. 3A and FIG. 3B, the up-down partition wall 41 (and the lower wall 31B of the housing main body 31) is provided with a lance 410 configured to retain the female terminal 7 accommodated in the female terminal accommodation room 5. The lance 410 is provided one for each female terminal accommodation room 5. Also, in a natural state, the lance 410 is formed to extend in an obliquely upper side Z1 as toward the rear side X2 of each female terminal accommodation room 5.

As shown in FIG. 3A, FIG. 3B, and FIG. 4, the insulation wall 42 is continuously provided on the lower side Z2 of the upper wall 31A of the housing main body 31 (or the up-down partition wall 41) while being provided to extend in a planar shape including the front-rear direction X and the up-down direction Z. A front-end surface 42S, at the rear side X2, of this insulation wall 42 is configured to be positioned at the same position with the rear end of the busbar accommodation room 30 in the front-rear direction X and to be positioned at the rear side X2 further than the rear end of the busbar 2 in the state in which the busbar 2 is accommodated in the busbar accommodation room 30 described below.

As shown in FIG. 3A and FIG. 3B, the left-right partition wall 43 is continuously provided on the lower side Z2 of the upper wall 31A of the housing main body 31 (or the up-down partition wall 41) while being provided to extend in a planar shape including the front-rear direction X and the up-down direction Z. A rear end of the left-right partition wall 43, in a state in which the busbar 2 is accommodated in the busbar accommodation room 30 described below, is configured to be positioned at the front side X1 of a base portion 21 of the busbar 2 and at the rear side X2 of the front end of each tab terminal 20.

A shown in FIG. 3B, the displacement restriction portion 44 is provided in the insulation wall 42 and the left-right partition wall 43 while being provided at the position in contact with the pair of extending pieces 22, 22 provided in each tab terminal 20 in the state in which each busbar 2 is accommodated in the busbar accommodation room 30 described below. Also, the displacement restriction portion 44 is formed that the protrusion amount in the left-right direction Y increases as toward the front side X1, and the displacement restriction portion 44 is configured to restrict the displacement of each tab terminal 20 in the left-right direction Y so as to position each tab terminal 20 at the predetermined position in the left-right direction Y at the time when coming into contact with the pair of extending pieces 22, 22.

As shown in FIG. 4, the busbar clamping portion 45 is configured to include a pair of clamping pieces 45A, 45B to clamp the base portion 21 in the busbar 2 therebetween.

As shown in FIG. 4, the busbar clamping portion 45 is provided in a plural (as the same number as that of the left-right partition wall 43). The plurality of busbar clamping portions 45 are apart from each other with a space (hereinafter there is a case of being recorded as the jig guide groove 34) formed in the left-right direction Y.

Each clamping piece 45A, 45B is formed in a flat plate shape, and is provided to face each other in the up-down direction Z. Each clamping piece 45A, 45B is provided to extend on a plane including the front-rear direction X and the left-right direction Y. Also, each clamping piece 45A, 45B is formed to continue with the upper end and the lower end of the left-right partition wall 43 and extend to the rear side X2.

As shown in FIG. 4, the plurality of busbar accommodation rooms 30 are configured that each busbar 2 is accommodated in each busbar accommodation room 30. According to the present embodiment, the busbar accommodation rooms 30 are stacked in three segments. Hereinafter, as shown in FIG. 4, there is a case in which the busbar accommodation room 30 positioned at the upper side Z1 is recorded as a "first busbar accommodation room 30A", the busbar accommodation room 30 positioned at the lower side Z2 is recorded as a "third busbar accommodation room 30C", and the busbar accommodation room 30 positioned between the first busbar accommodation room 30A and the third busbar accommodation room 30C is recorded as a "second busbar accommodation room 30B".

As shown in FIG. 3A and FIG. 3B, each busbar accommodation room 30 includes a base portion accommodation room 32 in which the base portion 21 is accommodated, and a plurality of tab terminal accommodation rooms 33 in which each tab terminal 20 is accommodated. The base portion accommodation room 32 is provided at the rear side X2 of each tab terminal accommodation room 33 while being continuously provided in the left-right direction Y.

Each tab terminal accommodation room 33 is continuously provided in the front side X1 from a predetermined position in the left-right direction Y of the base portion accommodation room 32. Also, each tab terminal accommodation room 33 is provided to extend in the front-rear direction X so as to be able to accommodate each tab terminal 20.

As shown in FIG. 3A, the plurality of female terminal accommodation rooms 5 are provided side by side in the left-right direction Y. Also, each female terminal accommodation room 5 is provided to extend in the front-rear direction X so as to be able to accommodate each female terminal 7. That is, each female terminal accommodation room 5 and each tab terminal accommodation room 33 are provided side by side in a straight line while each female terminal accommodation room 5 is provided at the front side X1 of each tab terminal accommodation room 33.

When the female terminal 7 is inserted into such female terminal accommodation room 5, the female terminal 7 abuts and the lance 410 is bent temporarily, and when the insertion is further advanced and the female terminal 7 reaches a proper position, the lance 410 is restored, the female terminal 7 is retained, and the female terminal 7 is adapted to be accommodated in the female terminal accommodation room 5. Also, in a state in which the female terminal 7 is accommodated in each female terminal accommodation room 5, each busbar 2 is accommodated in each busbar accommodation room 30 while each tab terminal 20 is inserted into each tab terminal accommodation room 33 such that the female terminal 7 and the tab terminal 20 is electrical connected with each other.

Furthermore, as shown in FIG. 4, the jig guide groove 34 in which a push-in portion 61 of the push-in jig 6 to be described below is inserted is provided in the housing 3. The jig guide groove 34, in the left-right direction Y, is positioned between the adjacent busbar clamping portions 45 and is formed of a space into which the push-in portion 61 of the push-in jig 6 described below is inserted.

Figure 5A:
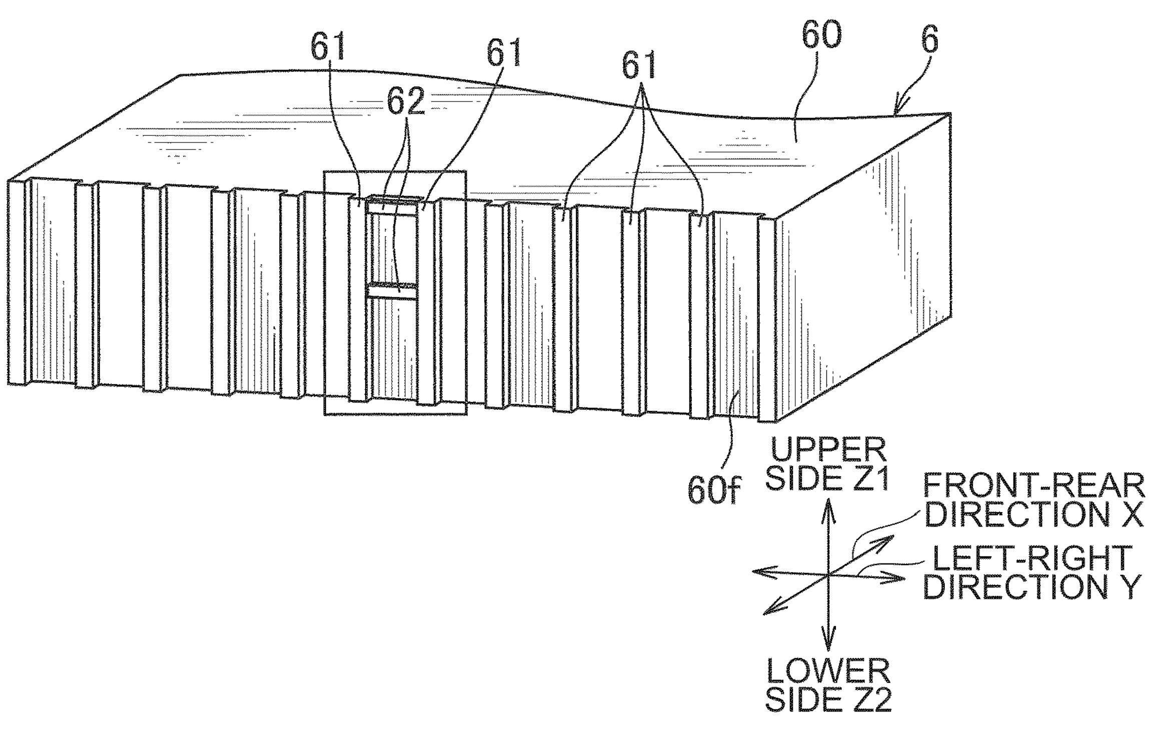
FIG. 5A is a perspective view showing a push-in jig for assembling the connector.
Figure 5B:
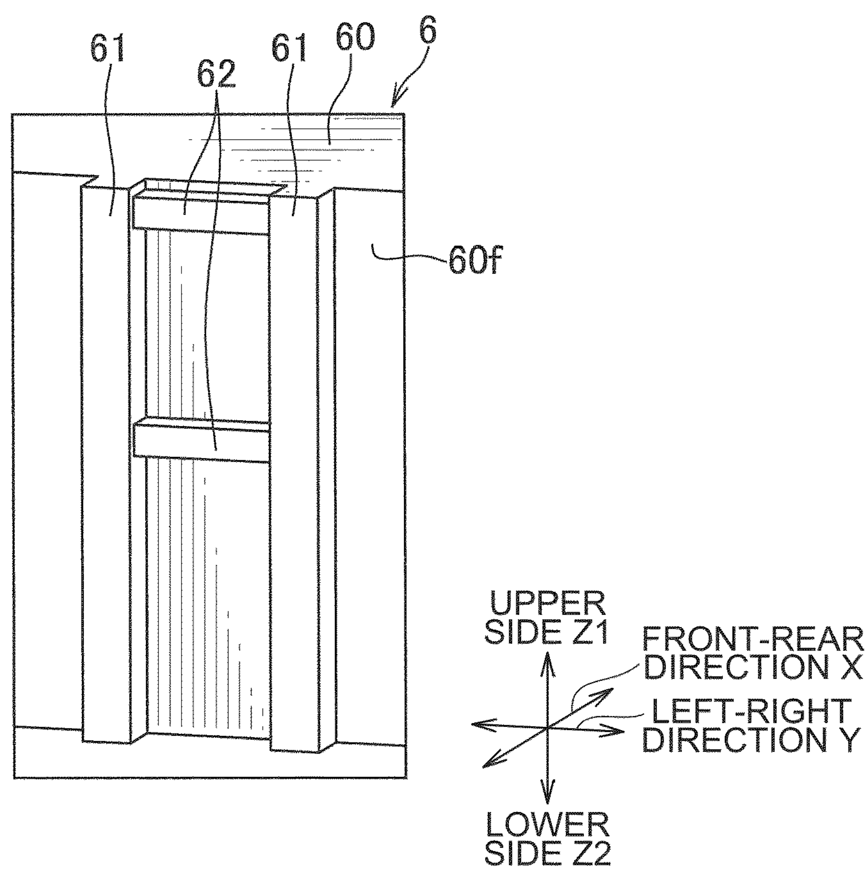
FIG. 5B is a view enlarging FIG. 5A.

Furthermore, as shown in FIG. 5A and FIG. 5B, the push-in jig 6 includes a jig main body 60 in a rectangular parallelepiped shape, the push-in portions 61 provided to protrude from a front surface (contact surface) **60*f* of the jig main body 60 in the front side X1, and a different-item-number detection portion (detection portion, contact portion) 62. The push-in portions 61 are provided on the protrusions extending in the up-down direction Z and provided at intervals in the left-right direction Y so as to correspond to the jig guide grooves 34 provided in the housing 3**.

In this manner, the protrusion dimension (dimension in the front-rear direction X) of each push-in portion 61 is formed to be the dimension corresponding to a distance from the rear end of the busbar accommodation room 30 (the same position with that of the front-end surface 42S of the insulation wall 42 in the front-rear direction X) to a predetermined position of the busbar accommodation room 30 where the rear end of the busbar 2 reaches. Accordingly, in a case in which the push-in jig 6 is pushed to the housing 3, the busbar 2 is pushed by the push-in portion 61 and when the busbar 2 that is pushed by the push-in portion 61 reaches the predetermined position of the busbar accommodation room 30, the front surface 60*f* of the jig main body 60 comes into contact with the rear end of the busbar accommodation room 30, that is, the front-end surface 42S of the insulation wall 42 such that the movement of the push-in jig 6 toward the housing 3 is stopped.

As shown in FIG. 5A and FIG. 5B, two of the different-item-number detection portions 62 are provided according to the present embodiment. The two different-item-number detection portions 62 are provided to protrude from the front surface 60*f* of the jig main body 60 to the front side X1. The different-item-number detection portion 62 according to the present embodiment is configured to be unmovable (unable to displace). Also, the different-item-number detection portion 62 is positioned at a central portion in the left-right direction Y while being configured to be bridged across the adjacent push-in portions 61, 61 in the left-right direction Y. Also, the two different-item-number detection portions 62 are arranged side by side in the up-down direction Z, wherein the different-item-number detection portion 62 at the upper side Z1 is provided at the position corresponding to the first busbar accommodation room 30A and the different-item-number detection portion 62 at the lower side Z2 is provided at the position corresponding to the second busbar accommodation room 30B.

Figure 6A:
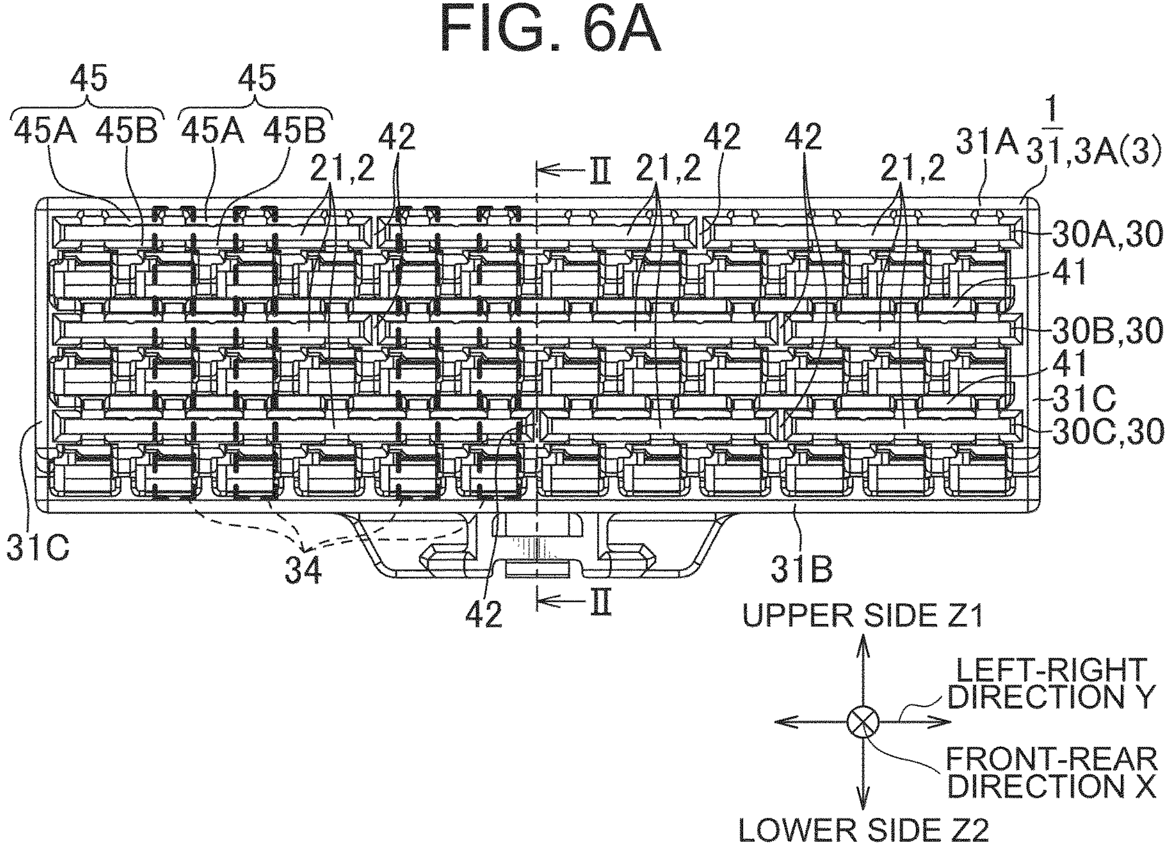
FIG. 6A is a view for describing a case in which the housing and the push-in jig is a regular combination as a view viewing the connector from the rear side.
Figure 6B:
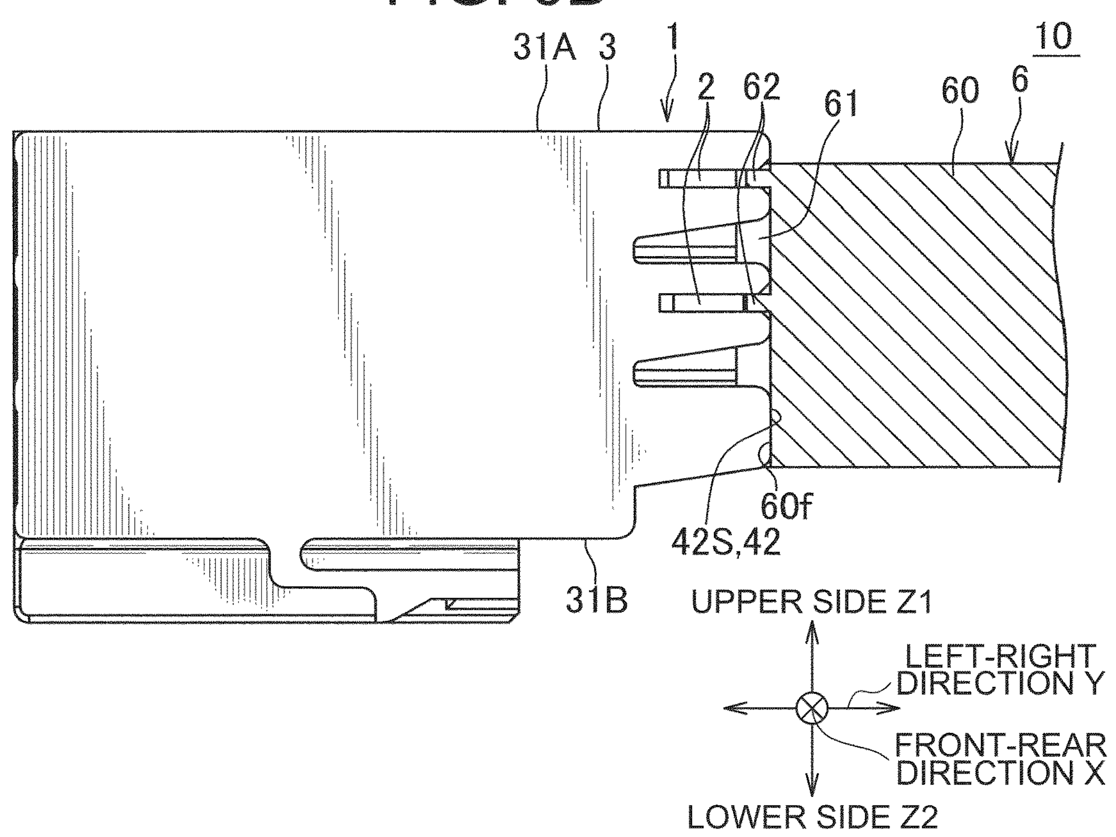
FIG. 6B is a view for describing a case in which the housing and the push-in jig is a regular combination as a cross-sectional view along a line II-II in FIG. 6A for describing a situation in which a push-in of the busbar by a push-in portion is allowed.

Regarding such different-item-number detection portion 62, as shown in FIG. 6A, when the push-in portion 61 of the push-in jig 6 is brought to approach the jig guide groove 34 and the push-in jig 6 is pushed to the housing 3A(3), in a case in which there is no insulation wall 42 formed at the position with which the different-item-number detection portion 62 comes into contact, as shown in FIG. 6B, the push-in portion 61 and the different-item-number detection portion 62 pushes the busbar 2 so as to make the busbar 2 to reach the predetermined position of the busbar accommodation room 30. That is, the pushing of the busbar 2 by the push-in portion 61 is allowed. In this manner, the pushing of the busbar 2 by the push-in portion 61 is allowed such that the combination of the housing 3A and the push-in jig 6 is the regular combination, and it is detected by the operator that this housing 3A is the housing 3A assigned with the desired item number. Additionally, in FIG. 6B, the hatching indicating the cross section of the connector 1 is omitted.

Figure 7A:
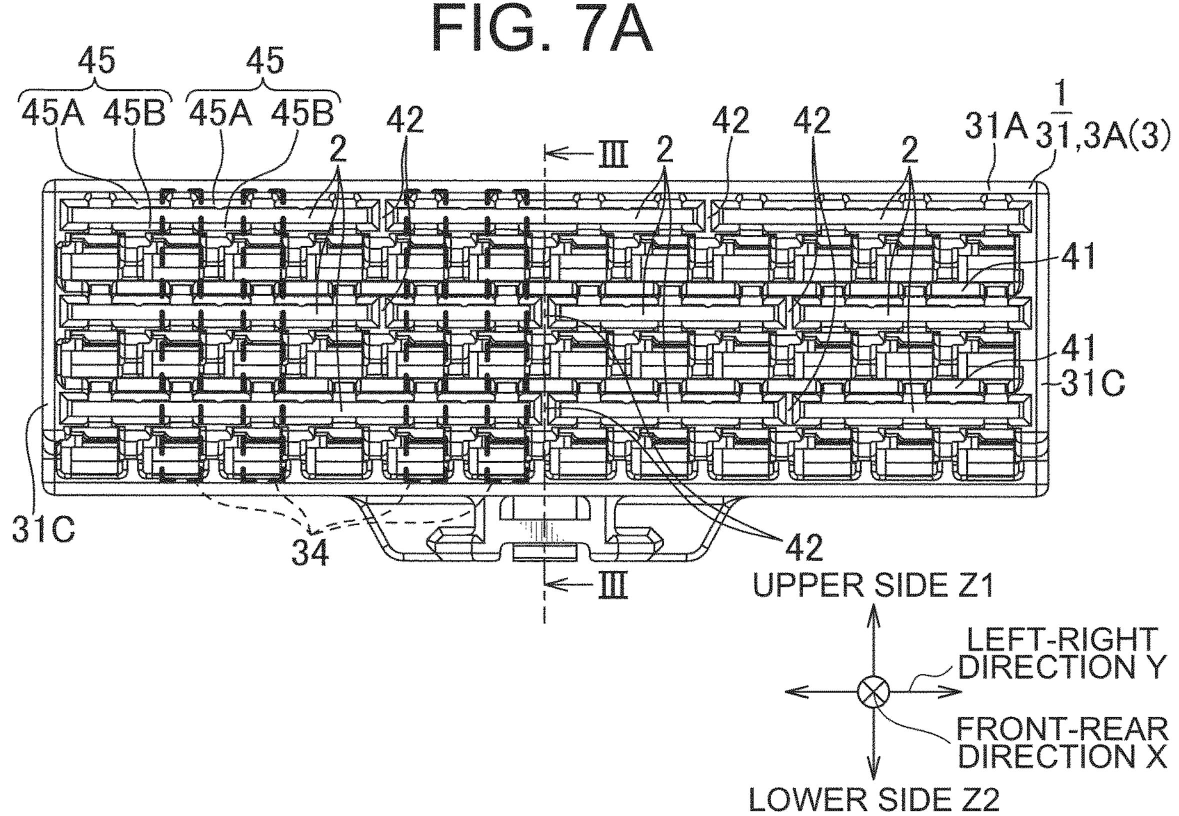
FIG. 7A is a view for describing a case in which the housing and the push-in jig is the regular combination as a view viewing the connector from the rear side.
Figure 7B:
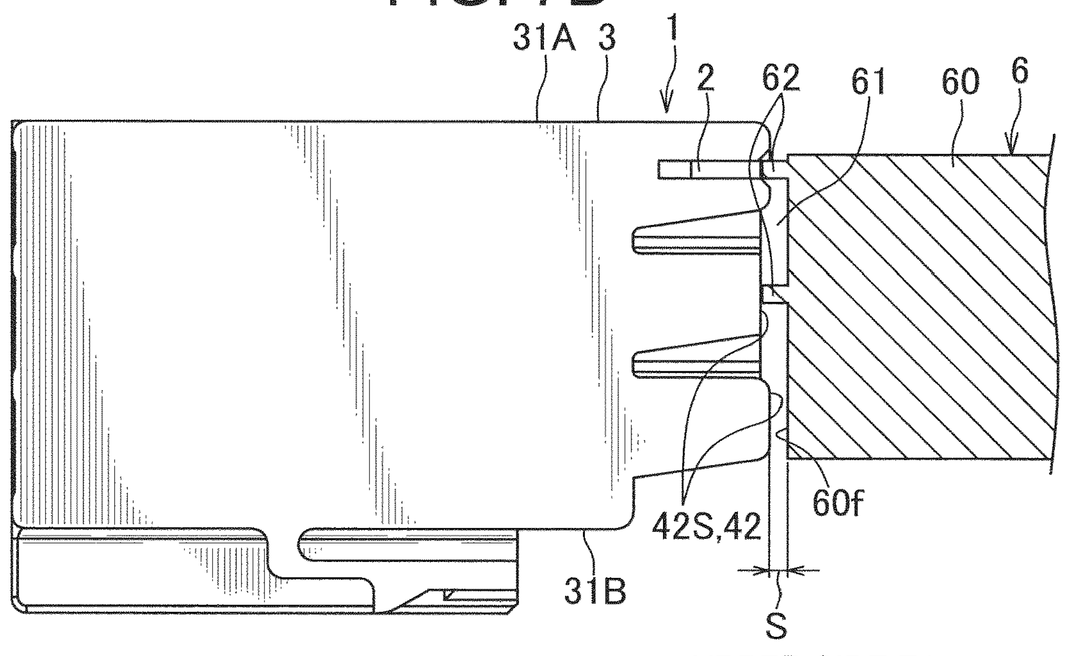
FIG. 7B is a view for describing a case in which the housing and the push-in jig is the regular combination as a cross-sectional view along a line III-III in FIG. 7A for describing a situation in which the push-in of the busbar by the push-in portion is restricted.
Figure 7B:
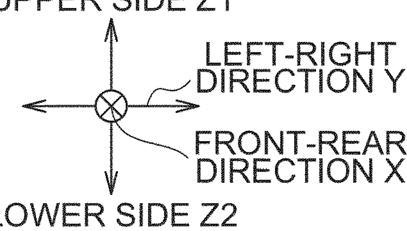

Regarding such different-item-number detection portion 62, as shown in FIG. 7A, when the push-in portion 61 of the push-in jig 6 is brought to approach the jig guide groove 34 and the push-in jig 6 is pushed to the housing 3B(3), in a case in which there is the insulation wall 42 formed at the position with which the different-item-number detection portion 62 comes into contact, as shown in FIG. 7B, the different-item-number detection portion 62 comes into contact with the insulation wall 42 and the movement of the push-in jig 6 is restricted. That is, the pushing of the busbar 2 by the push-in portion 61 is restricted. In this manner, the pushing of the busbar 2 by the push-in portion 61 is restricted so as to lead to a state in which the front surface 60*f* of the jig main body 60 and the front-end surface 42S of the insulation wall 42 are apart from each other to form a gap S therebetween. In this manner, the combination of the housing 3B and the push-in jig 6 is a irregular combination, and it is detected by the operator that this housing 3B is the housing 3B with a different item number. Additionally, in FIG. 7B, the hatching indicating the cross section of the connector 1 is omitted.

The procedures of assembling such connector 1 using the push-in jig 6 are described by referring to FIG. 6A and FIG. 6B.

The front end of each tab terminal 20 of each busbar 2 is brought to approach each busbar accommodation room 30 and inserted therein. Here, the push-in portion 61 of the push-in jig 6 is brought to approach the jig guide groove 34 and the push-in jig 6 is pushed to the housing 3A(3). Accordingly, the push-in portion 61 and the different-item-number 62 push in the busbar 2 to cause the busbar 2 to reach the predetermined position of the busbar accommodation room 30. The front surface 60*f* of the jig main body 60 comes into contact with the front-end surface 42S of the insulation wall 42, the busbar 2 reaches the predetermined position of the busbar accommodation room 30, and the movement of the push-in jig 6 toward the housing 3 is stopped. In this manner, the different-item-number detection portion 62 is not in contact with the insulation wall 42 and the push in of the busbar 2 by the push-in portion 61 is allowed such that it is detected by the operator that the housing 3A and the push-in jig 6 are the regular combination and this housing 3A is the housing 3A with the desired item number.

Here, as shown in FIG. 7A, assuming that the push-in portion 61 of the push-in jig 6 is brought to approach the jig guide groove 34 and the push-in jig 6 is pushed toward the housing 3B, as shown in FIG. 7B, in the case in which the different-item-number detection portion 62 is in contact with the insulation wall 42, the further movement of the push-in jig 6 is restricted. That is, the pushing of the busbar 2 by the push-in portion 61 is restricted. In this manner, the pushing of the busbar 2 by the push-in portion 61 is restricted such that it is detected by the operator that the housing 3B and the push-in jig 6 are the irregular combination and this housing 3B is the housing 3B with a different item number.

In this manner, substantially at the same time when the busbar 2 reaches the predetermined position of the busbar accommodation room 30 and it is detected by the operator that the housing 3A is the housing 3A with the desired item number, regarding the busbar 2, each extending piece 22 of each tab terminal 20 is in contact with the displacement restriction portion 44 of the busbar accommodation room 30 and the displacement of each busbar 2 in the left-right direction Y is restricted. Also, each tab terminal 20 is inserted to the inside of the female terminal 7, and the female terminal 7 and each tab terminal 20 is electrically connected with each other. In this manner, the busbar 2 is accommodated in the busbar accommodation room 30. In this manner, the connector 1 is assembled.

According to the above-described embodiment, when the push-in jig 6 is pushed to the housing 3, and in the case in which the different-item-number detection portion (detection portion) 62 is not in contact with the insulation wall 42, the housing 3 and the push-in jig 6 are detected as the regular combination, and when the push-in jig 6 is pushed to the housing 3, and in the case in which the different-item-number detection portion (detection portion) 62 is in contact with the insulation wall 42, the housing 3 and the push-in jig 6 are detected as the irregular combination. Accordingly, it is possible to confirm whether the housing 3 has the desired item number without providing the dedicated shape. That is, it is possible to identify the housing 3 without providing the dedicated shape such that it is possible to provide the product with the compact shape. Also, regarding the push-in jig 6, it is possible to correspond to various combinations by changing the positions and the number of the different-item-number detection portion (detection portion) 62 in response to the position of the insulation wall 42 in the housing 3. Accordingly, it is possible to realize the identification of the housing 3 at a low cost.

Also, the different-item-number detection portion (detection portion) 62 is provided to protrude from the jig main body 60, in the case in which the housing 3 and the push-in jig 6 are the regular combination, the different-item-number detection portion 62 is not in contact with the insulation wall 42 and the push in of the busbar 2 by the push-in portion 61 is allowed, and in the case in which the housing 3 and the push-in jig 6 are the irregular combination, the different-item-number detection portion 62 is in contact with the insulation wall 42 and the push in of the busbar 2 by the push-in portion 61 is restricted. Accordingly, when the push in of the busbar 2 by the push-in jig 6 is allowed, it is detected by the operator that the connector 1 (that is, the housing 3) has the desired item number, and when the push in of the busbar 2 by the push-in jig 6 is restricted, it is detected by the operator that the connector 1 (that is, the housing 3) has the different item number that is not the desired item number. In this manner, in the process of assembling the connector 1, it is possible to detect whether or not the connector 1 (that is, the housing 3) has the different item number without increasing the number of the process so as to reduce the assembly cost.

Also, the jig main body 60 includes the front surface (contact surface) **60*f* being able to come into contact with the front-end surface 42S of the insulation wall 42, the push-in portion 61 and the different-item-number detection portion (detection portion) 62 is provided to protrude from the front surface 60*f*, and the push-in jig 6 is configured that when the push in of the busbar 2 by the push-in portion 61 is allowed, the front surface 60*f* is in contact with the front-end surface 42S of the insulation wall 42 at the position where the push in of the busbar 2 is completed. Accordingly, when the front surface 60*f* of the jig main body 60 comes into contact with the front-end surface 42S of the insulation wall 42, the completion of the push in of the busbar 2 is recognized by the operator. Accordingly, it is possible to improve the assembly workability of the connector 1**.

Also, the present invention is not limited to the above-described embodiment, and the modifications and the like shown below, including other configurations being able to achieve the object of the present invention, are included in the scope of the present invention.

According to the above-described embodiment, the different-item-number detection portion (detection portion, contact portion) 62 is configured to be unmovable (unable to displace), however, the present invention is not limited thereto. The detection portion may be configured of a movable probe pin. In this case, the detection portion may be configured such that when the push-in jig 6 is pushed to the housing 3, in a case in which the probe pin (detection portion) is not in contact with the insulation wall 42 and the probe pin does not displace (move), it is detected by the operator that the housing 3 and the push-in jig 6 are the regular combination this housing 3 is assigned with the desired item number, and when the push-in jig 6 is pushed to the housing 3, in a case in which the probe pin (detection portion) is in contact with the insulation wall 42 and the probe pin displaces (moves), it is detected by the operator that the housing 3 and the push-in jig 6 are the irregular combination and this housing 3 is the housing 3 assigned with a different item number.

In addition, although the best configuration, method and the like for carrying out the present invention have been disclosed in the above description; however, the present invention is not limited thereto. That is, the present invention is specifically illustrated and described with respect to a particular embodiment, however, it is possible for a person with ordinary skill in the art to make various modifications to the embodiment described above in the detailed configuration of shapes, materials, quantities, and the like without departing from the technical scope and objectives of the present invention. Therefore, the description limiting the shape, material, and the like disclosed above is exemplified for facilitating understanding of the present invention, and since it is not intended to limit the present invention, the description in the name of member excluding the limitations of the shape, material, and the like in part or all, should also be included in the scope of the present invention.

REFERENCE SIGNS LIST

- 10 different-item-number detection structure
- 1 connector
- 2 busbar
- 3 housing
- 6 push-in jig
- 30 busbar accommodation room
- 31 housing main body
- 42 insulation wall
- 42S front-end surface of insulation wall
- 60 jig main body
- **60*f*** front surface (contact surface)
- 61 push-in portion
- 62 different-item-number detection portion (detection portion, contact portion)

What is claimed is:

1. A different-item-number detection structure for detecting whether a combination of an electrical connector and a push-in jig is regular, wherein the connector includes a plurality of busbars and a housing including a plurality of busbar accommodation rooms configured to accommodate the plurality of busbars respectively, the housing includes a housing main body formed in a cylindrical shape and an insulation wall configured to partition an inside of the housing main body to insulate the busbars from each other, the busbar accommodation room being provided in a space that is partitioned by the insulation wall, the push-in jig includes a jig main body, a plurality of push-in portions provided to protrude from the jig main body for pushing in the busbars, and a detection portion provided in the jig main body and configured to detect whether or not the housing is regular, when the push-in jig is pushed toward the housing, in a case in which the detection portion is not in contact with the insulation wall, it is detected that the housing and the push-in jig form a regular combination, and when the push-in jig is pushed toward the housing, in a case in which the detection portion is in contact with the insulation wall, it is detected that the housing and the push-in jig form an irregular combination.

2. The different-item-number detection structure according to claim 1, wherein the detection portion is a contact portion provided to protrude from the jig main body, in the case in which the housing and the push-in jig form the regular combination, the contact portion does not come into contact with the insulation wall, and the pushing in of the busbar into the busbar accommodation room by the push-in portion is allowed, and in the case in which the housing and the push-in jig form the irregular combination, the contact portion comes into contact with the insulation wall, and the push in of the busbar into the busbar accommodation room by the push-in portion is restricted.

3. The different-item-number detection structure according to claim 2, wherein the jig main body includes a contact surface that is contactable with a front-end surface of the insulation wall, and the push-in portion and the contact portion are provided to protrude from the contact surface, and the push-in jig is configured such that when the push in of the busbar by the push-in portion is allowed, the contact surface comes into contact with the front-end surface of the insulation wall at a position where the push in of the busbar is completed.

* * * * *